(12) United States Patent
Chang et al.

(10) Patent No.: US 7,937,284 B2
(45) Date of Patent: May 3, 2011

(54) METHOD AND SYSTEM FOR MANAGING TIME-BASED ORGANIZATION HIERARCHIES

(75) Inventors: Daniel T. Chang, Belmont, CA (US);
Alexander Goldstein, Foster City, CA (US); Yucheng Hu, Redwood City, CA (US); Ying Wang, San Mateo, CA (US); Pasan Rukmal Sirisena, San Mateo, CA (US); Steve Apfelberg, Menlo Park, CA (US); Marc Verbeek, Foster City, CA (US); John J. Jakubik, Menlo Park, CA (US); David Faibish, Foster City, CA (US); Jie Liu, Redwood City, CA (US); Tarri Furlong, San Leandro, CA (US); Ashley Stirrup, Burlingame, CA (US); Ajay Sabhlok, Fremont, CA (US); Martin Renaud, San Carlos, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1391 days.

(21) Appl. No.: 10/273,538

(22) Filed: Oct. 18, 2002

(65) Prior Publication Data
US 2007/0226025 A1 Sep. 27, 2007

Related U.S. Application Data

(60) Provisional application No. 60/333,430, filed on Nov. 27, 2001.

(51) Int. Cl.
*G05B 19/418* (2006.01)
*G06F 9/46* (2006.01)

(52) U.S. Cl. .......................................................... 705/8
(58) Field of Classification Search ...................... 705/8
See application file for complete search history.

(56) References Cited

U.S. PATENT DOCUMENTS

| 5,386,557 A | | 1/1995 | Boykin et al. ..................... 707/1 |
| 5,924,077 A | | 7/1999 | Beach et al. ..................... 705/10 |
| 6,023,703 A | | 2/2000 | Hill ................................ 707/100 |
| 6,105,001 A | * | 8/2000 | Masi et al. ...................... 705/14 |
| 6,134,533 A | * | 10/2000 | Shell .............................. 705/26 |

(Continued)

OTHER PUBLICATIONS

Colletti et al. Compensating New Sales Roles: How to Design Rewards That Work in Today's Selling Environment, Second Edition. May 2001, AMACOM, p. 90.*

*Primary Examiner* — Beth V Boswell
*Assistant Examiner* — Folashade Anderson
(74) *Attorney, Agent, or Firm* — Campbell Stephenson LLP

(57) ABSTRACT

A method, system, and article of manufacture for defining and managing time-based organization hierarchies are disclosed herein. In one embodiment, a user interface, including a plurality of user interface displays configured to receive a user input to define and/or manage one or more instances of a time-based organization hierarchy, may be generated on a client. The user may then define, via interaction with the user interface, the at least one instance of the organization hierarchy to include a plurality of nodes, and specify an effective period for the instance of the time-based organization hierarchy by defining a start date and an end date. The user may also define a territory to correspond to each of the plurality of nodes in the organization hierarchy. In one embodiment, the territory may include at least one position and an assignment rule, the position having a corresponding quota.

44 Claims, 7 Drawing Sheets

U.S. PATENT DOCUMENTS

| | | |
|---|---|---|
| 6,360,188 B1 | 3/2002 | Freidman et al. ................. 703/1 |
| 6,405,207 B1 * | 6/2002 | Petculescu et al. ........... 707/102 |
| 6,421,648 B1 * | 7/2002 | Gagnon et al. .................... 705/1 |
| 6,601,048 B1 | 7/2003 | Gavan et al. ..................... 706/10 |
| 6,618,706 B1 * | 9/2003 | Rive et al. ....................... 705/30 |
| 6,625,602 B1 | 9/2003 | Meredith et al. .................. 707/8 |
| 6,662,164 B1 * | 12/2003 | Koppelman et al. ............ 705/14 |
| 6,691,093 B2 * | 2/2004 | Shell ............................... 705/26 |
| 6,947,951 B1 | 9/2005 | Gill ........................... 707/104.1 |
| 7,149,707 B2 * | 12/2006 | Scoble ............................ 705/14 |
| 2001/0049622 A1 | 12/2001 | Gozdeck et al. ................ 705/11 |
| 2002/0091649 A1 * | 7/2002 | Anvekar et al. ................. 705/72 |
| 2002/0169678 A1 * | 11/2002 | Chao et al. ...................... 705/26 |
| 2003/0028443 A1 | 2/2003 | Ellis et al. ....................... 705/26 |
| 2005/0010550 A1 * | 1/2005 | Potter et al. ...................... 707/1 |
| 2007/0226026 A1 * | 9/2007 | Chang et al. ..................... 705/8 |
| 2007/0226027 A1 * | 9/2007 | Chang et al. ..................... 705/8 |

* cited by examiner

METHOD AND SYSTEM FOR MANAGING TIME-BASED ORGANIZATION HIERARCHIES

CROSS-REFERENCE TO RELATED APPLICATION

This application is related to co-pending provisional application Ser. No. 60/333,430, filed Nov. 27, 2001, and titled METHOD AND SYSTEM FOR MANAGING TIME-BASED ORGANIZATION HIERARCHIES. The benefit of the filing date of the above-identified application is hereby claimed pursuant to 35 U.S.C. §119(e)(1).

TECHNICAL FIELD OF THE INVENTION

This disclosure relates generally to sales-based compensation mechanisms, and more particularly, but not exclusively, to a method, system, and article of manufacture for defining and/or managing time-based organization hierarchies.

BACKGROUND INFORMATION

Many large companies compensate employees on a commission basis in relation to sales credited to the employees. Typically, the management structure of these companies is organized as a hierarchy from the company president, for example, to the sales representatives. In order to provide credit for a given sale to multiple individuals, such as the sales representative, the sales manager, and the like, these companies often have complex sales organizations developed to provide matrix coverage, or territories wherein multiple people or groups of people receive credit on a single sale. For example, sales credit may be distributed to multiple individuals by adding everyone who is to be compensated for a transaction to a sales team (e.g., adding managers into the sales team with the sales representatives), or to a compensation group. However, as the complexity of the management structure increases, so to does the administration of these sales organizations.

In addition, sales organizations developed from the current hierarchical management structure generally allow sales credit to be assigned, and compensation to be calculated, only for the latest instance of a particular sales model. As changes occur in the management structure of the company (e.g., reorganization or personnel changes), the complexity of properly assigning sales credit and calculating compensation becomes increasingly complex and administratively burdensome.

SUMMARY OF THE ILLUSTRATED EMBODIMENTS

An aspect of the illustrated embodiments is to provide a method, system, and article of manufacture for defining and managing time-based organization hierarchies. In one embodiment, a user interface, including a plurality of user interface displays configured to receive a user input to define and/or manage one or more instances of a time-based organization hierarchy, may be generated on a client. The user may then define, via interaction with the user interface, the at least one instance of the organization hierarchy to include a plurality of nodes, and specify an effective period for the instance of the time-based organization hierarchy by defining a start date and an end date. The user may also define a territory to correspond to each of the plurality of nodes in the organization hierarchy. In one embodiment, the territory may include a position and an assignment rule, the position corresponding to a defined quota.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

Figure 8:
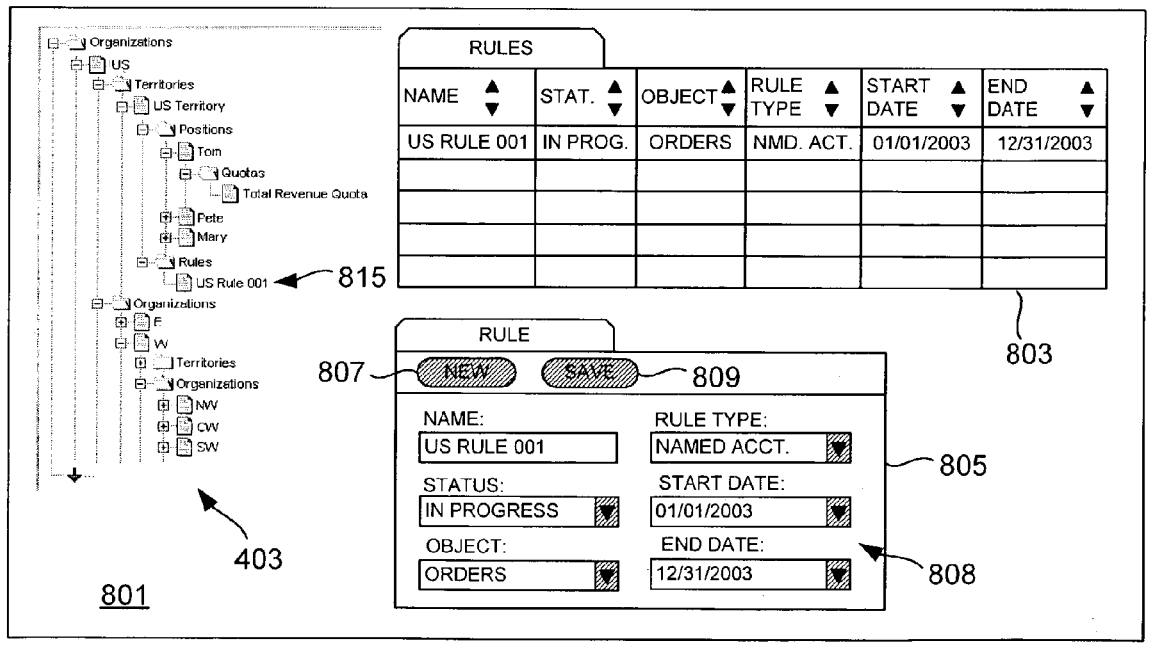
Figure 8A:
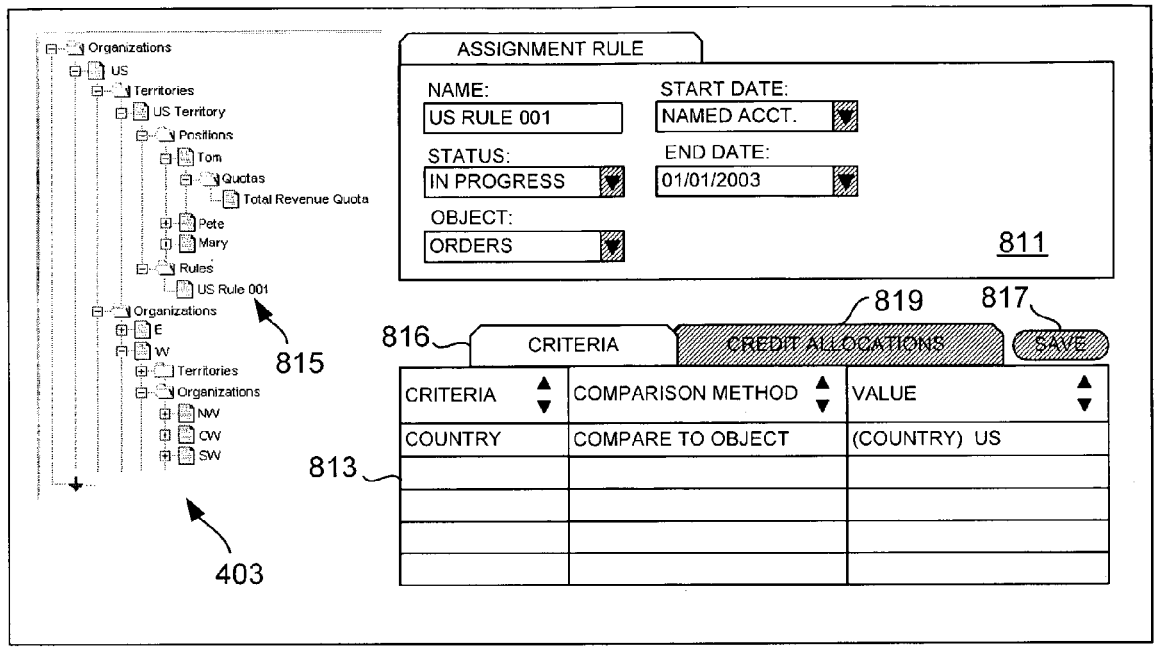
Figure 8B:
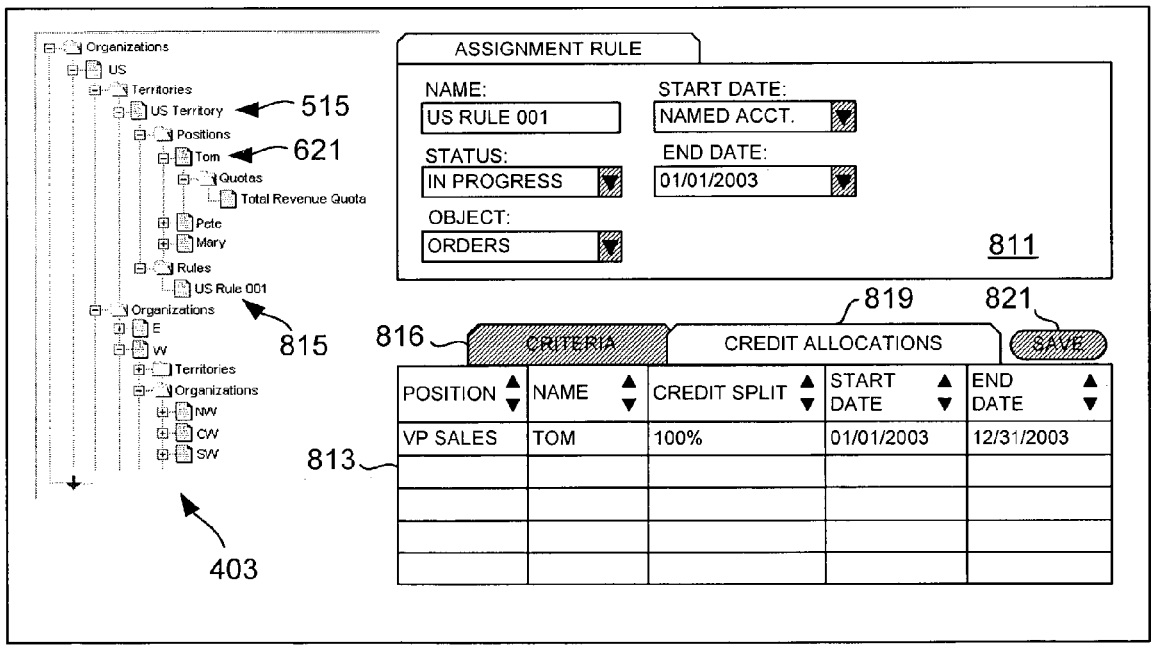
Figure 9:
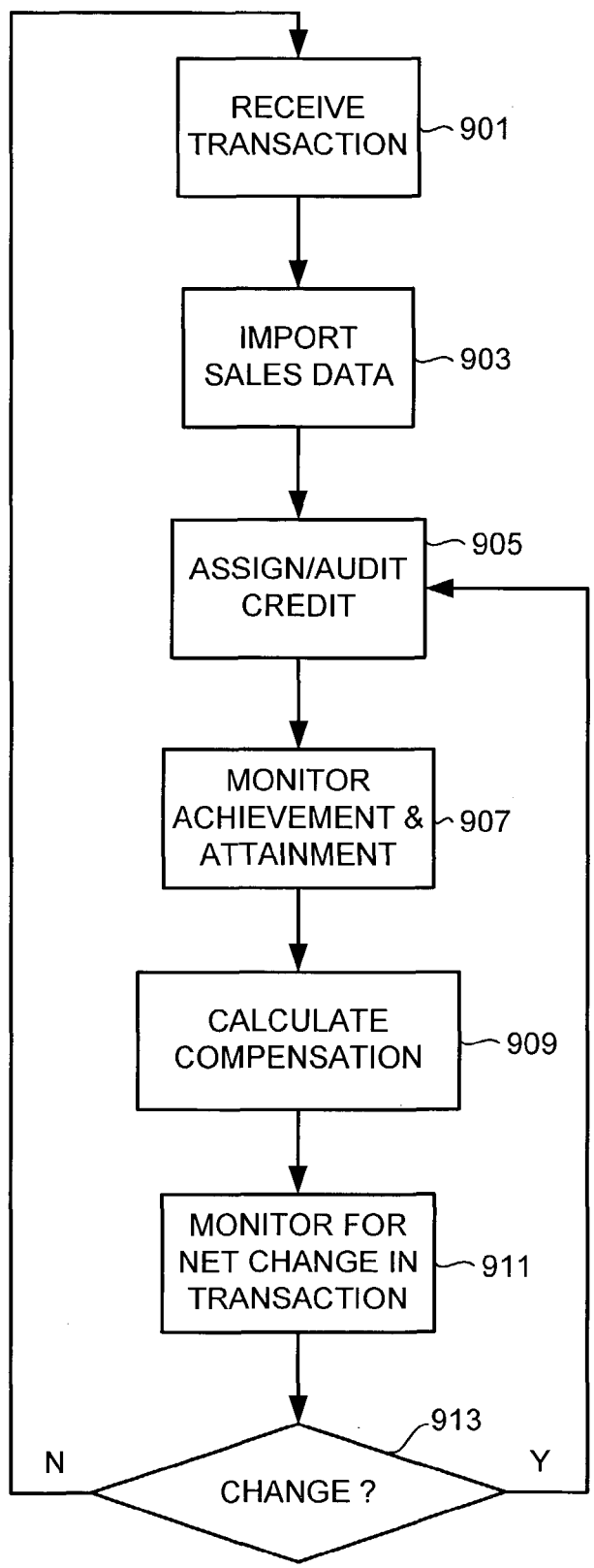

FIGS. 8, 8A, and 8B are illustrations of example screen displays showing embodiments of UI displays configured to define and manage rules of an example organization hierarchy in accordance with an embodiment of the present invention; and FIG. 9 is a flow diagram illustrating an embodiment of a flow of events in an example sales-based compensation process in accordance with an embodiment of the present invention.

DETAILED DESCRIPTION OF THE ILLUSTRATED EMBODIMENTS

Embodiments of a method, system, and article of manufacture for defining and managing time-based organization hierarchies to assign sales credits and calculate compensation related to transactions are described in detail herein. In the following description, numerous specific details are provided, such as the identification of various system components, to provide a thorough understanding of embodiments of the invention. One skilled in the art will recognize, however, that embodiments of the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide a method, system, and article of manufacture for defining and managing instances of time-based organization hierarchies (also referred to as "sales hierarchies"). In one representative example, an embodiment of a UI, implemented via a network system in accordance with an embodiment of the present invention, may include a plurality of UI displays configured to receive a user input to define and/or manage one or more instances of a time-based organization hierarchy (also "organization hierarchy"). For example, the user may define an instance of the time-based organization hierarchy to include a plurality of nodes, each corresponding to a defined territory. In various embodiments, the territories may correspond to a geographical area, to an industry sector, or the like. The user may also define a position to correspond to each territory for which sales credit and compensation may be calculated in response to a sales data input related to a transaction.

For example, the instance of the time-based organization hierarchy may comprise a pyramid structure including a company president position corresponding to a node at an uppermost level (e.g., a "root node" or "primary node"), followed by a pair of sales manager positions corresponding to a pair of nodes at a middle level (e.g., "secondary nodes"), and a plurality of sales representative positions corresponding to a plurality of nodes at a lower-most level (e.g., "tertiary nodes") of the organization hierarchy. When the transaction (e.g., sale of a product/service) occurs, the sales data input (e.g., corresponding to data, including an order date, amount, quantity, location, and the like) may be processed to assign sales credit to the lower-most node from which the transaction originated. Moreover, a corresponding sales credit may then be rolled-up to each successive parent node in the organization hierarchy until the root node (e.g., the primary node) is reached.

The time-based organization hierarchy may also be defined, in an embodiment, to correspond to a sales model (e.g., direct sales), and to have an effective period. The effective period may be defined by a start date and an end date. In this manner, multiple instances of the time-based organization hierarchy, each with an entirely distinct effective period, may be defined with minor variations (e.g., related to personnel changes, organization structure changes, or the like) to allow sales credit to be assigned, and attainment and/or compensation calculated, for any one or more of the positions with regard to any one corresponding time period. By maintaining instances of the time-based organization hierarchy corresponding to different calendar periods (e.g., via storage in a memory), retroactive calculations may be made to reflect adjustments in sales data (e.g., changes to an order) that occur after the corresponding organization hierarchy has been made obsolete by an updated instance. In one embodiment, efficient storage of a plurality of instances of an organization hierarchy may include storing revisions made to successive versions of the hierarchy. Other features of the illustrated embodiments will be apparent to the reader from the foregoing and the appended claims, and as the detailed description and discussion is read in conjunction with the accompanying drawings.

Figure 1:
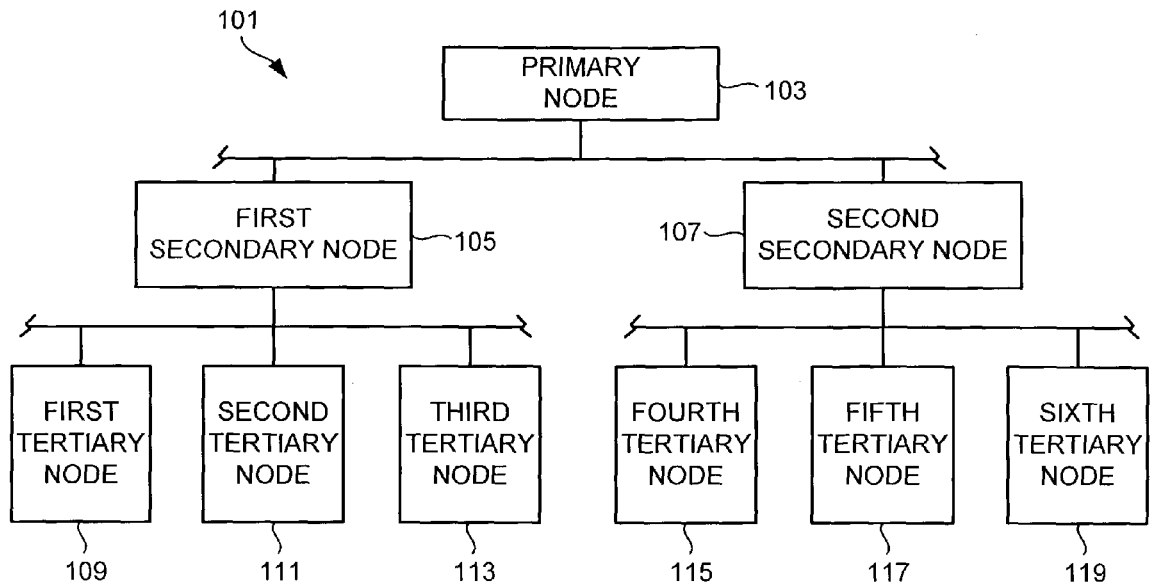
FIG. 1 is a pictorial illustration of an example organization hierarchy in accordance with an embodiment of the present invention.

With reference now to the drawings, and in particular to FIG. 1, an embodiment of a time-based organization hierarchy 101 is illustrated in accordance with an embodiment of the present invention. In the illustrated embodiment, the time-based organization hierarchy 101 includes a primary node 103 (e.g., the root node) at an upper-most level of the hierarchy. At a level directly below the primary node 103 are a first secondary node 105 and a second secondary node 107. In turn, at a level directly below the first secondary node 103 are a first tertiary node 109, a second tertiary node 111, and a third tertiary node 113. Similarly, directly below the second secondary node 105 are a fourth tertiary node 115, a fifth tertiary node 117, and a sixth tertiary node 119. It will be appreciated that the organization hierarchy 101 illustrated in FIG. 1 and described herein is intended only as an example. Additional nodes may be included at each level of the hierarchy, and/or additional levels may also be included in the organization hierarchy 101 in embodiments in accordance with an embodiment of the present invention.

In one embodiment, each of the nodes 103-119 of the time-based organization hierarchy 101 may correspond to a defined territory. Each territory may be defined, for example, to correspond to a geographical area such as the United States, or parts thereof, or to an industry sector, such as telecommunications, banking, automotive, or the like, or to parts thereof. For instance, the primary node 103 may be defined to correspond to a territory encompassing the geographical area of the entire United States. Furthermore, the first secondary node 105 may be defined to correspond to the western United States, while the second secondary node 107 may be defined to correspond to the eastern United States (e.g., the geographical area east of the Mississippi River). In turn, each of the tertiary nodes 109-119 of the time-based organization hierarchy 101 illustrated in FIG. 1 may further subdivide the geographical area, for example, corresponding to the node (e.g., the secondary nodes 105 and 107) from which they stem in the organization hierarchy 101. For example, the tertiary nodes 109-119 may correspond to a northwest, centerwest, southwest, northeast, centereast, and southeast territory, respectively, each corresponding to a group of states, in an embodiment. It will be appreciated that nodes associated with additional levels of the organization hierarchy 101 may further subdivide the geographical area, for example, into smaller and smaller parts in various embodiments. In one embodiment, each node (e.g., the nodes 103-119) may correspond to a unique territory (only one node in the instance of the organization hierarchy corresponds to that territory), as will be discussed in greater detail hereinafter.

It will be appreciated that methodologies in accordance with an embodiment of the present invention described herein may comprise a set of machine-readable instructions capable of implementation by a computer or other device, in an embodiment. As used herein, the term "machine-readable medium" shall be taken to include any medium that is capable of storing data, information, or encoding a sequence of instructions or operations for execution by a processor to cause the performance of the methodologies of embodiments of the present invention. The term "machine-readable medium" shall be understood to include, for example, solid-state memories, read-only memory components, random-access memory components, magnetic disk storage media, optical storage media, flash memory devices, electrical, optical, or other form of propagated signals (e.g., carrier tones, infrared signals, and digital signals), and the like.

Figure 2:
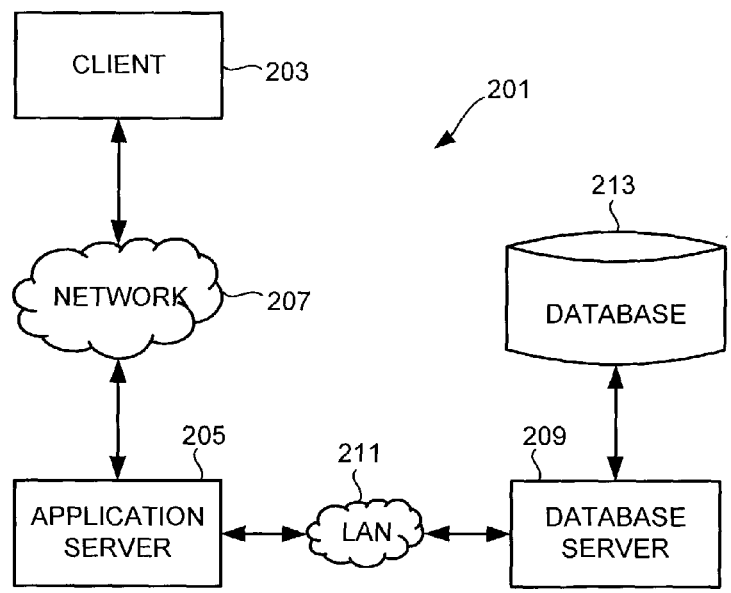
FIG. 2 is a block diagram illustrating an embodiment of a network system in accordance with an embodiment of the present invention.

In one embodiment, the methodologies of the present invention may be implemented via a graphical UI generated by a client, such as a computer system, or the like. For example, FIG. 2 is a block diagram illustration of an embodiment of a network system 201 in which methodologies in accordance with an embodiment of the present invention may be implemented. In the illustrated embodiment, the network system 201 includes a client 203 communicatively coupled to an application server 205 via a network 207. The application server 205 may in turn be communicatively coupled to a database server 209 via a local area network ("LAN") 211, or the like, to facilitate the storage of data in, and/or retrieval of data from, a database 213, in an embodiment. In one instance the database 213 may comprise a relational database management system database. The network 207 may comprise any one of a number of network links, such as for example, but not limited to, the Internet, a wide area network ("WAN"), a LAN, an intranet, or the like, and may include physical connections such as wires, cables, optical fibers, or the like, and/or transceivers capable to receive and/or transmit wireless communications (e.g., transmitted through the atmosphere), in various embodiments.

In one embodiment, the UI may be communicated to the client 203, from the application server 205, as a series of hypertext markup language ("HTML") documents capable of being processed in conjunction with a browser application executable by the client 203. The communication of the UI from the application server 205 to the client may be facilitated by a communication protocol such as hypertext transfer protocol ("HTTP"), or other suitable communication protocol, in an embodiment. The UI may include, in an embodiment, a plurality of UTI displays configured to receive a user input to define one or more instances of a time-based organization hierarchy (e.g., the organization hierarchy 101, FIG. 1) in accordance with an embodiment of the present invention, as will be discussed in greater detail hereinafter. In addition, embodiments of the present invention may permit the user to track historical transactions, quotas, and/or territories to facilitate retroactive calculations in response to adjustments of sales data inputs. It will be appreciated that in one embodiment of the invention, the methodologies may be implemented via a distributed processing environment including multiple clients and/or servers.

Figure 3:
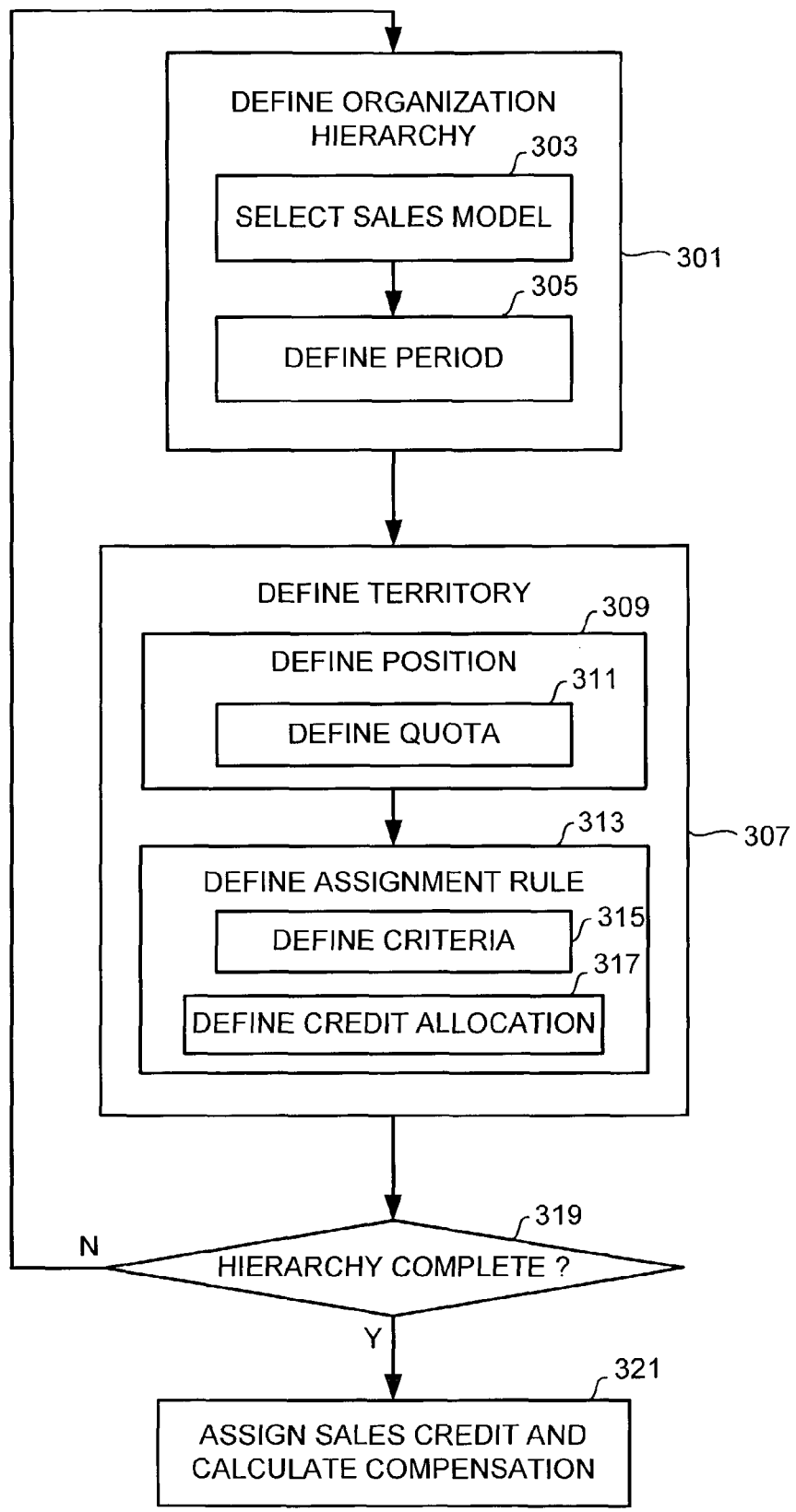
FIG. 3 is a flow diagram illustrating an embodiment of a flow of events in an example definition process in accordance with an embodiment of the present invention.

With reference now primarily to FIG. 3, an embodiment of a flow of events in an example definition process is shown in accordance with an embodiment of the present invention. As the following discussion proceeds with regard to FIG. 3, reference is made to FIGS. 4-8C to illustrate various aspects of embodiments of the present invention. As used herein, "user" is intended to refer to any one or more persons, computer operators, or the like, implementing the methodologies of embodiments of the present invention.

As a starting point, the user may define a first instance of the time-based organization hierarchy (e.g., the organization hierarchy 101, FIG. 1) (see, e.g., process block 301) to include one or more nodes, such as those described above, and illustrated in FIG. 1. In one embodiment, the user may define the first instance of the time-based organization hierarchy 101 via a UI display, as discussed above, such as that illustrated in FIG. 4.

Figure 4:
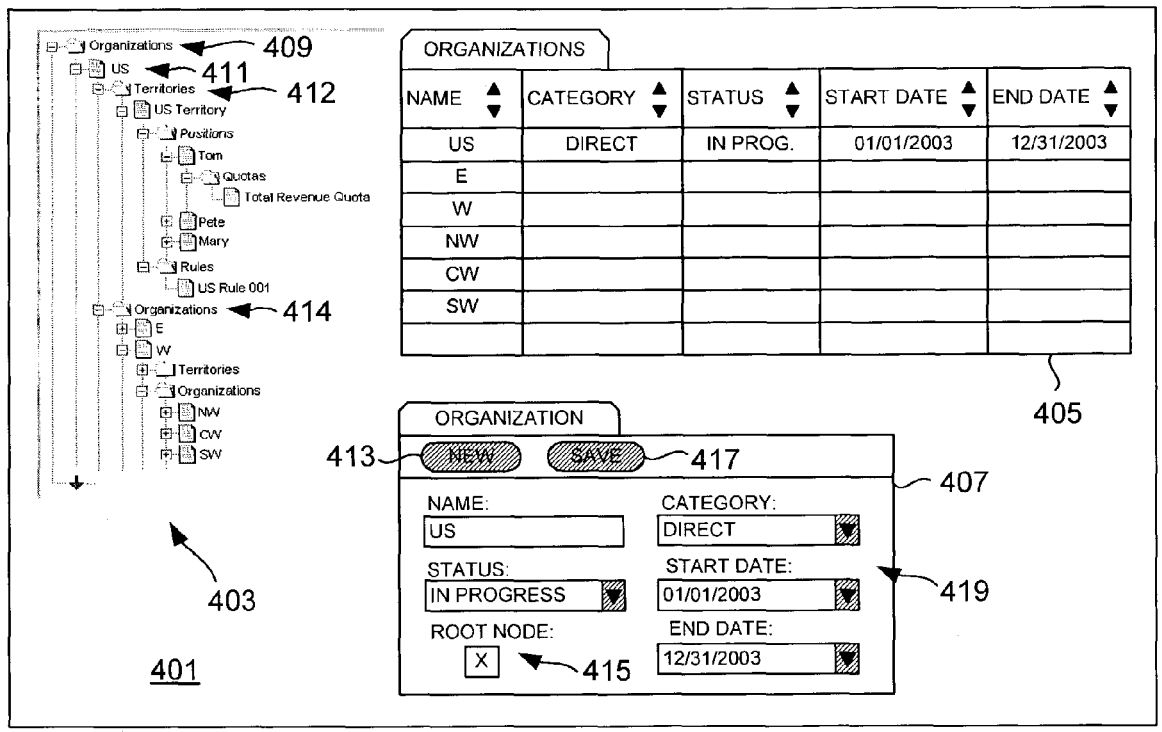
FIG. 4 is an illustration of an example screen display showing an embodiment of a user interface ("UI") display configured to define and manage nodes of an example organization hierarchy in accordance with an embodiment of the present invention.

FIG. 4 is an illustration of an example screen display showing an embodiment of an organization view UI display 401 configured to define and manage nodes of an example organization hierarchy (e.g., the organization hierarchy 101, FIG. 1) in accordance with an embodiment of the present invention. The organization view UI display 401 includes an organization tree applet 403 to display a visual representation of the relationship among the plurality of nodes of the organization hierarchy 101 and the elements associated with each node. In addition, the organization view UI display 401 may include an organization list applet 405, and an organization form applet 407, in an embodiment.

The organization tree applet 403 may, in one embodiment, include a plurality of folders (e.g., an organizations folder 409), and a plurality of corresponding records (e.g., a US record 411). It will be appreciated that the folders are merely a mechanism for organizing the records contained therein, and need not be present in all embodiments of the present invention. It will also be appreciated that the organization tree applet 403 illustrated in FIG. 4 and throughout the figures includes folders and/or records that would not be present at all stages of the definition process illustrated in FIG. 3, but would be added progressively as the hierarchy is defined by the user. For example, as a starting point, only the organizations folder 409 may be present in the organization tree applet 403. When the user creates the first record (e.g., the US record 411), then additional folders (e.g., a territories folder 412 and a secondary organizations folder 414) may be created in an embodiment.

Similarly, when records are created in the new folders (e.g., folders 412 and 414), respectively, then additional folders corresponding to those records will also be created in the organization tree applet 403, and so on. Each record and/or folder may be selected to show the folders and/or records contained therein. In this regard, it will also be appreciated that other records and/or folders corresponding to the "E" organization record, the "W" organization record, and the like, like those described above, are not shown in the organization tree applet 403 as illustrated in the figures, but may be accessed by the user by expanding (e.g., via user selection thereof) those particular records.

As mentioned above, in one embodiment, when the user first accesses the organization view UI display 401, only a single folder (e.g., the top-most "organizations" folder 409) may be displayed in the organization tree applet 403. In order to define a first instance of the time-based organization hierarchy, the user may select the single folder (e.g., the "organizations" folder 409) and create a new organization record (by user selection of the "NEW" button 413) by entering data into the data fields 419 of the organization form applet 407. For example, the user may enter a "Name" for the organization record, such as "US," a "Category" (also "sales model") for the organization hierarchy (see, e.g., process block 303, FIG. 3), such as "Direct," and select a status, such as "In Progress," as well as a "Start Date" and an "End Date" for an effective period (see, e.g., process block 305, FIG. 3) that will correspond to the time-based organization hierarchy. Because this first organization represents the root node (see, e.g., the primary node 103, FIG. 1), an indicator 415 identifying this characteristic may appear on the organization form applet 407, in an embodiment. When all of the requisite information has been entered into the data fields 419 of the organization form applet 407, the user may select a "SAVE" button 417 to create an organization record (e.g., the organization record 411) corresponding to the data entered by the user. The organization record 411 may then appear in the organization tree applet 403 and in the organization list applet 405, in an embodiment. It will be appreciated that with each "SAVE," the preceding information input by the user may be communicated to the application server 205 (see, e.g., FIG. 2) via the network 207 and ultimately to the database server 209 to facilitate storage of the information/data in the database 213.

As indicated above, the user may specify a "Name" for the organization record. The name may be chosen at the user's discretion, but for purposes of clarity, may correspond to a territory definition that will be created by the user, as discussed hereinafter. The "Category," or sales model, for the instance of the organization hierarchy may be selected by the user (see, e.g., block 303, FIG. 3) from a predefined list of values, such as direct sales (also "Direct"), service, product specialist, channel, inside sale, and global account, or the like, in an embodiment. It will be appreciated that these distinctions (i.e., sales models) may be used to define a relationship among participants in an organization hierarchy (e.g., between nodes). The terms used to correspond to the various sales models may be arbitrarily chosen to indicate a particular sales structure within an organization. The particular terms chosen and used herein generally describe business models used in industry, thereby enabling companies to more accurately label these hierarchy instances, but other terms may be used depending on the specific desires of the user.

The "Status" field of the organization form applet allows the user to select from a predefined list of values regarding the status of the organization hierarchy. When the hierarchy is being created, the "Status" will remain "In Progress." Other options may include "Submitted" (as part of an approval process), "Approved," and/or "Expired." In one embodiment, the organization form applet 407 may include data fields (not shown) in which the user may specify the date on which the organization hierarchy was submitted for review and approval, and to whom it was submitted to facilitate tracking within the company.

The "Start Date" and the "End Date" fields (of the organization form applet 407) correspond to an effective period for the organization hierarchy. In one embodiment in accordance with an embodiment of the present invention, only a single instance of a particular category (e.g., sales model) of organization hierarchy may be effective during any given calendar period. As such, the start date of a second instance of the organization hierarchy may be no earlier in time than the day following the end date of the first instance of the organization hierarchy. It will be appreciated however, that multiple instances of an organization hierarchy, each corresponding to a different category, may have overlapping effective periods, in an embodiment.

Continuing with the foregoing example, and with continued reference to FIG. 3, the user may next define a territory (see, e.g., process block 307) to correspond to the primary node (e.g., the US record 411) defined above. In one embodiment, the user may define the territory via a territory view UI display, such as that illustrated in FIG. 5. In one embodiment, user actuation of the "SAVE" button 417 (see, e.g., FIG. 4) to save the US record 411, may cause the territories folder 412 and the secondary organizations folder 414 to be created in the organization tree applet 403. User selection of the territories folder 412 may cause the territory view UI display 501 of FIG. 5 to be displayed by the client (e.g., the client 203, FIG. 2), in an embodiment.

Figure 5:
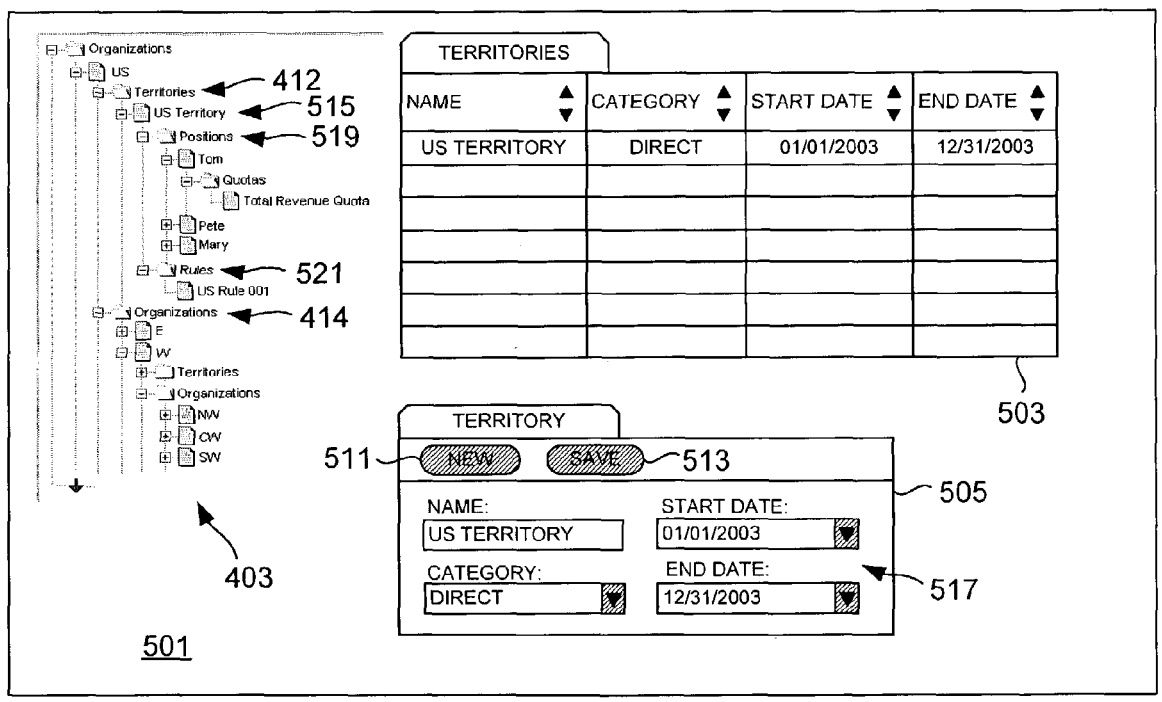
FIG. 5 is an illustration of an example screen display showing an embodiment of a UI display configured to define and manage territories of an example organization hierarchy in accordance with an embodiment of the present invention.

In one embodiment, the territory view UI display 501 of FIG. 5 includes the organization tree applet 403, as well as a territory list applet 503 and a territory form applet 505. In order to define a new territory, the user may select a "NEW" button 511 on the territory form applet 505. The user may, in an embodiment, enter information into the data fields 517 of the territory form applet 505 to define the territory corresponding to the previously defined node (e.g., the US record 411, FIG. 4; primary node 103, FIG. 1). The "Name" of the territory (e.g., "US Territory") may be selected from a pick-list, in an embodiment, of available territories defined by a compensation administrator, for example. The user may also select a "Category" such as "Direct" as well as a "Start Date"

and an "End Date." In one embodiment, the "Category" for the territory will be predefined to match the "Category" field selected for the corresponding node (e.g., the US record 411, FIG. 4), and the "Start Date" and "End Date" may be selected to fall within the period defined by the "Start Date" and "End Date" selected for the organization hierarchy instance (e.g., the "Start Date" and "End Date" defined for the primary node of the organization hierarchy) with which the territory is associated.

When all of the requisite information has been entered into the data fields 517 of the territory form applet 505, the user may save the defined territory by selecting a "SAVE" button 513 to add a territory record 515 (also "US Territory record") to the organization tree applet 403, and to the territory list applet 503, in an embodiment. In a manner similar to that described above in conjunction with FIG. 4, user actuation of the "SAVE" button 513 to save the US Territory record 515 may cause a positions folder 519 and a rules folder 521 to be created in the organization tree applet 403. In one embodiment, territory definitions may be reused in different organization hierarchies, or in different instances of an organization hierarchy, thereby reducing administrative effort and improving system performance in regard to the creation of new organization hierarchies.

Continuing with the foregoing example, and with continued reference to FIG. 3, the user may next define one or more positions (see, e.g., process block 309) to correspond to the previously defined territory (e.g., the US Territory record 515, FIG. 5). In one embodiment, user selection of the positions folder 519 may cause a positions view UI display, such as that illustrated in FIG. 6, to be generated by the client (e.g., the client 203, FIG. 2).

Figure 6:
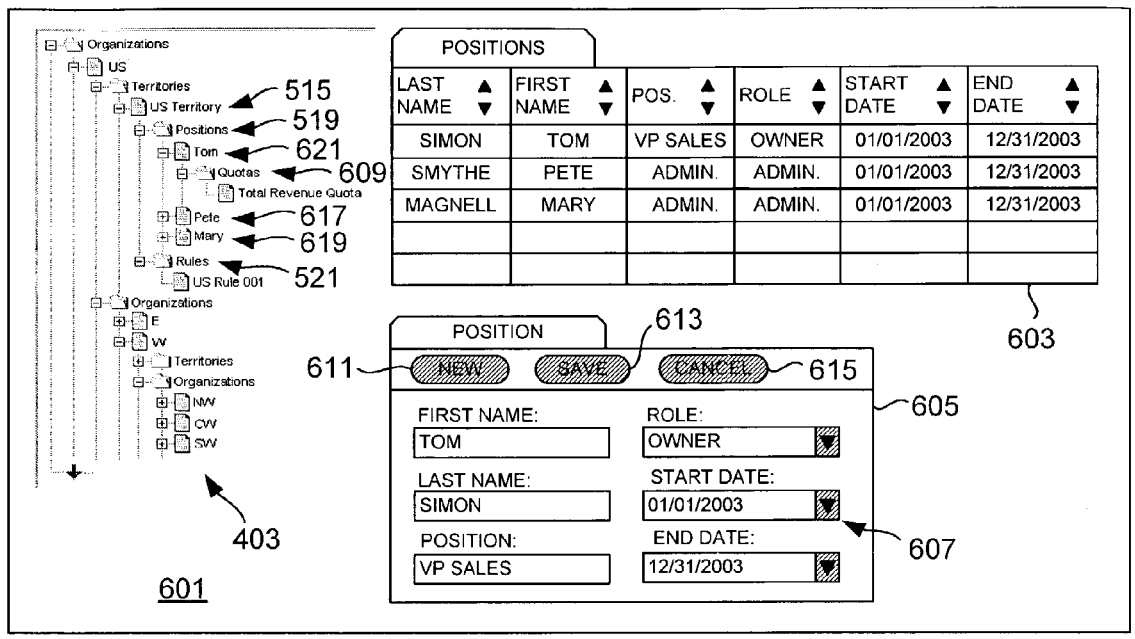
FIG. 6 is an illustration of an example screen display showing an embodiment of a UI display configured to define and manage positions of an example organization hierarchy in accordance with an embodiment of the present invention.

With reference now primarily to FIG. 6, the positions view UI display 601 includes, in one embodiment, the organization tree applet 403, as well as a positions list applet 603 and a position form applet 605 to receive a user input to define at least one position (see, e.g., block 309, FIG. 3) associated with the territory (e.g., the US Territory record 515) described above. In one embodiment, the user may define a position to correspond to the territory (e.g., the US Territory record 515) by selecting a "NEW" button 611 on the position form applet 605. The user may then enter information into the data fields 607 of the position form applet 605. For example, the user may select an individual (e.g., having a first name, last name, and company position) from a pick-list of available positions that may be assigned to a given level of the organization hierarchy, in an embodiment. For instance, in the present example, the Vice President of Sales, Tom Jefferson, may be selected as the position for which sales credit will be assigned, and compensation calculated, in regard to the defined node (e.g., the US record 411, FIG. 4) of the particular instance of the time-based organization hierarchy with which the position is associated (the position may actually be associated with the territory, and the territory corresponds to the node in the organization hierarchy).

In addition, a "Role" may be selected for the position, such as "Owner" or "Administrator." In one embodiment, only a single "Owner" position may correspond to any given territory (e.g., the US Territory record 515), but multiple "Administrator" positions may also be defined for the territory to allow multiple individuals to access and oversee the organization hierarchy, to the extent that it is accessible from any given node or organization record within the hierarchy. For instance, two example "Administrator" position records 617 and 619 are illustrated in the organization tree applet 403 corresponding to the defined territory (e.g., the US Territory record 515).

In one embodiment, the "Administrator" positions are configured to grant users access to the organization hierarchy only for the purpose of editing and/or managing the definition of lower levels of the organization hierarchy. For example, a user accessing the organization hierarchy via an "Administrator" position defined to correspond to the primary node 103 (see, e.g., FIG. 1) may define elements of the secondary nodes 105, 107 (see, e.g., FIG. 1) and/or the tertiary nodes 109-119 (see, e.g., FIG. 1), in an embodiment. In contrast, a user accessing the organization hierarchy via an "Administrator" position defined to correspond to the first secondary node 105 (see, e.g., FIG. 1) may define elements of the tertiary nodes 109-113 (see, e.g., FIG. 1) directly stemming therefrom and any child nodes of the tertiary nodes 109-113 (see, e.g., FIG. 1). It will be appreciated that "Administrator" positions need not necessarily be defined for all territories, and, in one embodiment, serve only an administrative purpose and are not assigned sales credit in response to a sales data input, as will be discussed in greater detail hereinafter. In addition to the foregoing, a "Start Date" and an "End Date" may also be defined for the position. In one embodiment, the "Start Date" and the "End Date" will fall within the period defined by the "Start Date" and the "End Date" defined for the territory, as described above in conjunction with FIG. 5.

When all of the requisite information has been entered by the user, the user may save the defined position by selecting a "SAVE" button 613 on the position form applet 605 to create a position record 621 corresponding to the defined position in the organization tree applet 403, and in the positions list applet 603, in an embodiment. It will be appreciated that the user may cancel positions from the territory (e.g., the US Territory record 515), in an embodiment, by identifying the position in the positions list applet 603 (via a cursor for example), and selecting a "CANCEL" button 615 on the position form applet 605. In a manner similar to that described above in conjunction with FIG. 4, user actuation of the "SAVE" button 613 to save the position record 621 may cause a quotas folder 609 to be created in the organization tree applet 403, in a manner similar to that described above.

With continued reference to the foregoing example, and to FIG. 3, the user may next define a quota (see, e.g., process block 311) to correspond to the previously defined position (see, e.g., the Tom record 621, FIG. 6). In one embodiment, user selection of the quotas folder 609 may cause a quotas view UI display, such as that illustrated in FIG. 7, to be generated by the client (e.g., the client 203, FIG. 2).

Figure 7:
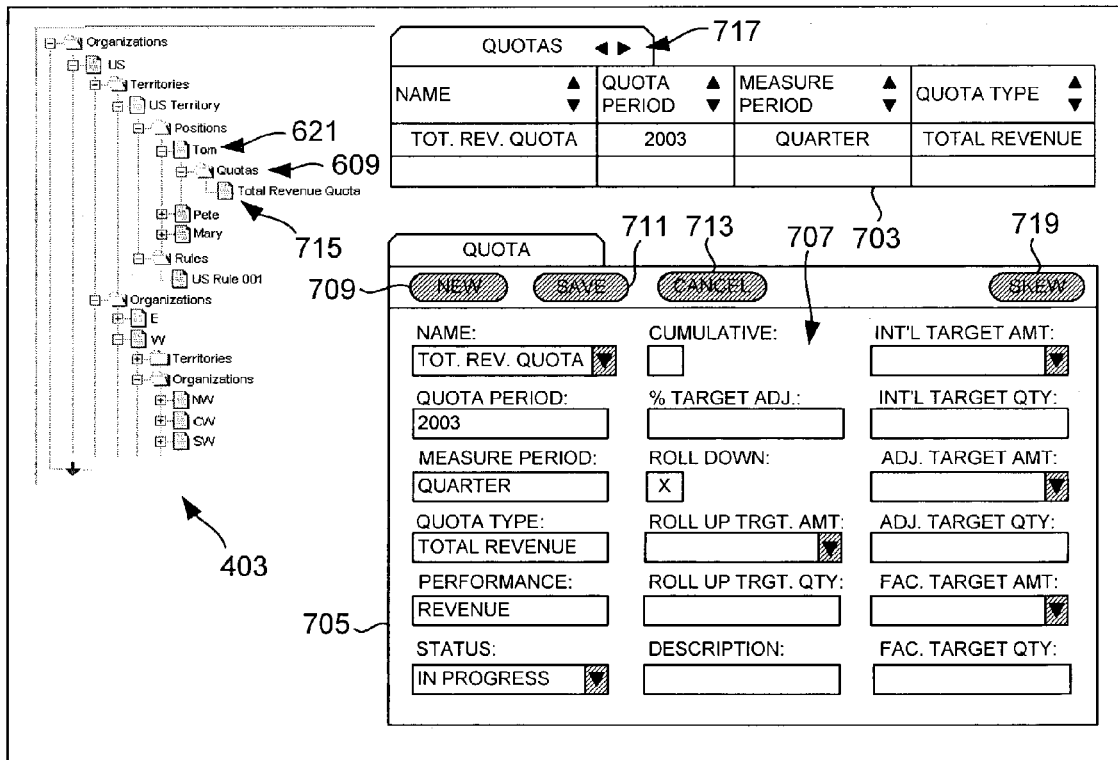
FIG. 7 is an illustration of an example screen display showing an embodiment of a UI display configured to define and manage quotas of an example organization hierarchy in accordance with an embodiment of the present invention.

With reference now primarily to FIG. 7, the quotas view UI display 701 includes, in one embodiment, the organization tree applet 403, as well as a quotas list applet 703 and a quota form applet 705 to receive a user input to define a quota (see, e.g., block 311, FIG. 3) to correspond to the defined position (e.g., the Tom record 621) described above. In one embodiment, the user may define a quota to correspond to the position (e.g., the Tom record 621) by selecting a "NEW" button 709 on the quota form applet 705. The user may then enter information into the data fields 707 of the quota form applet 705, in an embodiment.

For example, the user may specify a "Name" for the quota, identify a "Quota Type" such as a "Total Revenue Quota," define a "Quota Period" such as a year (e.g., 2003) and a "Measure Period" such as a quarter, month, or the like, and a "Performance Measure" such as revenue or product quantity. In addition, the user may also specify an "Initial Target Amount" and/or "Initial Target Quantity," an "Adjusted Target Amount" and/or "Adjusted Target Quantity," as well as a "Factored Target Amount" and/or "Factored Target Quantity," in an embodiment. The "Initial Target Amount" and/or "Initial Target Quantity" corresponds to the starting target in revenue amount or quantity of the employee on this Quota, in an embodiment. The "% Target Adjustment field contains a percentage to apply to an employee's initial target amount. The Adjusted Target Amount is updated for the employee on this Quota. The "Factored Target Amount" and/or "Factored Target Quantity" corresponds to the amount of the target after the factors have been applied by a manager. In one embodiment, the factored target starts with the adjusted target amount, then is changed based on the factors.

In addition to the foregoing, the user may specify a "Status" of the quota, as described previously, as well as a "Roll Up Target Amount," and a "Roll Up Target Quantity." final amount after the manager has adjusted and applied factors to employee's quotas. The user may also indicate whether the defined quota is intended to be cumulative. For example, if a "Cumulative" indicator (e.g., on the quota form applet 705) is selected by the user, the quota will accumulate from previous measure periods into the current measure period. For example, Q2 quota amount is the sum of Q1 and Q2, in an embodiment. The user may also indicate whether the defined quota is to be rolled down. For example, if a "Roll Down" indicator on the quota form applet 705 is selected by the user, the quota will be divided among the nodes (e.g., the secondary nodes 105, 107, FIG. 1) immediately below the node (e.g., the primary node 103, FIG. 1) to which the quota corresponds.

In one embodiment, the user may also enter a "Description" of the quota for administrative purposes. When all of the requisite information has been entered, the user may create a new quota record by selecting a "SAVE" button 711 on the quota form applet 705. The new quota record (e.g., the Total Revenue Quota record 715) may then be created in the organization tree applet 403 and in the quotas list applet 703, in an embodiment. The reader will note that not all of the data fields 707 of the quota form applet 705 are displayed in the quotas list applet 703 in the illustrated embodiment. However, in one embodiment, the user may view additional fields in the quotas list applet 703 by scrolling the display of the quotas list applet 703 via actuation of a pair of arrows indicated by reference numeral 717.

Figure 7A:
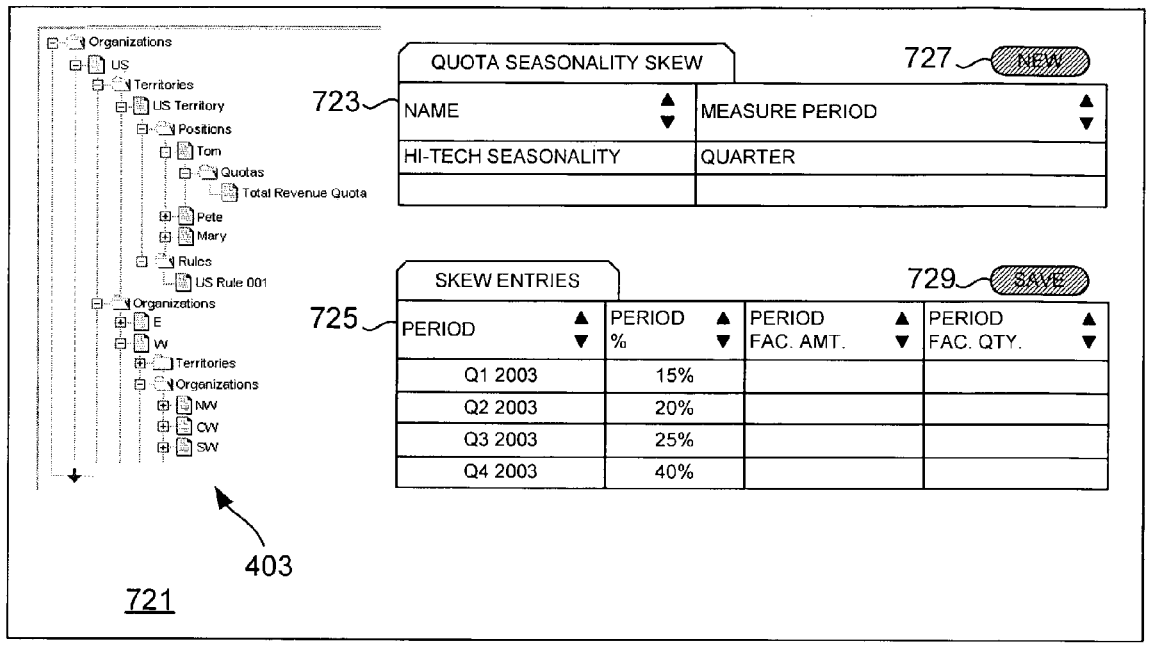
FIG. 7A is an illustration of an example screen display showing an embodiment of a UI display configured to define and manage seasonality skews of an example organization hierarchy in accordance with an embodiment of the present invention.

In some cases, the user may desire to apply a seasonality skew to the quota to accommodate different conditions in the market. In one embodiment, the user may define the seasonality skew by selecting a "SKEW" button 719 on the quota form applet 705. For example, and with reference primarily to FIG. 7A, a seasonality skew view UI display 721 includes, in one embodiment, the organization tree applet 403, as well as a quota seasonality skew list applet 723 and a skew entries list applet 725. In one embodiment, the user may create a new seasonality skew by selecting a "NEW" button 727, and entering a "Name" and "Measure Period" for the seasonality skew in the quota seasonality skew list applet 723. The user may also select a previously defined seasonality skew from the quota seasonality skew list applet 723, in an embodiment. For example, a seasonality skew defined for a parent node (e.g., the primary node 103, FIG. 1) may be available for selection to correspond to a quota associated with a child node (e.g., the secondary node 105, 107, FIG. 1). The "Measure Period" of the seasonality skew may correspond to the "Measure Period" of the quota to which the seasonality skew is to refer. The user may then define different percentages, different amounts, and/or different quantities for each period corresponding to the defined quota. When the requisite information has been entered, the user may save the seasonality skew by selecting the "SAVE" button 729, in an embodiment.

With continued reference to the foregoing example, and to FIG. 3, the reader will recall that in addition to the positions folder 519 (see, e.g., FIG. 6), the rules folder 521 (see, e.g., FIG. 6) was also created in the organization tree applet 403 in response to a user action to save the defined territory (e.g., the US Territory record 515, FIG. 5). In one embodiment, the user may next define an assignment rule (see, e.g., process block 313) to correspond to the previously defined territory (e.g., the US Territory record 515, FIG. 5). In a manner similar to user selection of the positions folder 519, user selection of the rules folder 521 from the organization tree applet 403 may cause a rules view UI display, such as that illustrated in FIG. 8, to be generated by the client (e.g., the client 203, FIG. 2), in an embodiment.

With reference now primarily to FIG. 8, the rules view UI display 801 includes, in one embodiment, the organization tree applet 403, as well as a rules list applet 803 and a rule form applet 805 configured to receive a user input to define an assignment rule to correspond to the defined territory (e.g., the US Territory 515, FIG. 5) described above. In one embodiment, the user may define an assignment rule to correspond to the territory (e.g., the US Territory record 515, FIG. 5) by selecting a "NEW" button 807 on the rule form applet 805. The user may then enter information into the data fields 808 of the rule form applet 805.

For example, the user may specify a "Name" for the rule such as "US Rule 001," a "Status," as described above, an "Object" against which the rule will be compared, as well as a "Rule Type," such as product, vertical, named account, and/or geographic, and a "Start Date" and an "End Date." In one embodiment, the "Start Date" and the "End Date" will fall within the calendar period defined by the "Start Date" and the "End Date" defined for the corresponding territory record (e.g., the US Territory record 515, FIG. 5). When all of the requisite information has been entered, the user may create a new rule record by selecting a "SAVE" button 809 on the rule form applet 805.

In one embodiment, user actuation of the "SAVE" button 809 on the rule form applet 805 may cause generation of a secondary rules view UI display, such as that illustrated in FIG. 8A or 8B. It will be appreciated that the UI displays illustrated in FIGS. 8A and 8B are identical, except for the tab selection (e.g., FIG. 8A shows a display corresponding to a Criteria tab 816, while FIG. 8B shows a display corresponding to a Credit Allocations tab 819) and corresponding display in the list applet 813. The secondary rules view UI display of FIGS. 8A and 8B may also include an assignment rule form applet 811, showing the data corresponding to the current rule that was previously entered by the user in the rule form applet 805 of FIG. 8.

With continued reference to the foregoing example, and to FIG. 3, the user may next define criteria (see, e.g., process block 315), and a credit allocation (see, e.g., process block 317) to correspond to the previously defined assignment rule (e.g., the US Rule 001 record 815).

With reference first to FIG. 8A, the user may specify a criteria (e.g., Country, State, or the like) against which a comparison will be made in order to facilitate sales credit assignment in association with the defined rule (e.g., the US Rule 001 record 815). The user may also specify a comparison method (e.g., Compare to Object) to identify the input source against which the comparison is to be made (in this case, an Order, as specified in the rule form applet 805 "Object" data field). In addition, the user may specify a value (e.g., Country=US) that may cause the condition created by the defined rule (e.g., the US Rule 001 record 815) to be "TRUE." In one embodiment, when all requisite information has been entered, the user may select a "SAVE" button 817, and then select the Credit Allocations tab 819 to view the display illustrated in FIG. 8B, for example.

With reference now primarily to FIG. 8B, the user may specify a position (e.g., the Tom record 621) corresponding to the defined territory (e.g., the US Territory record 515) with which the defined rule (e.g., the US Rule 001 815) is associated. In addition, the user may specify a "Start Date" and an "End Date" for the credit allocation, and a "Credit Split" (i.e., the percentage of sales credit for a particular transaction that will be assigned to the position if the condition associated with the corresponding rule is "TRUE"). In one embodiment, the "Start Date" and the "End Date" may fall within the calendar period defined by the "Start Date" and the "End Date" defined for the corresponding rule record (e.g., the US Rule 001 record 815).

With continued reference to the foregoing example, and to FIG. 3, when the user has finished defining the elements described above and illustrated by process blocks 301-317, a determination is made regarding whether the time-based organization hierarchy is complete (see, e.g., process block 319). If the organization hierarchy is not yet complete (e.g., additional nodes and/or territories need to be defined to complete the hierarchy), then the process illustrated in FIG. 3 may enter an iterative loop beginning again with process block 301. For example, in one embodiment, an individual associated with the first secondary node 105 (see, e.g., FIG. 1) may take on the role of the user to define the next node in the organization hierarchy and a corresponding territory, along with the other elements described above. In another embodiment, a single user may define the entire time-based organization hierarchy.

It will also be appreciated that, in one embodiment, all of the nodes of the organization hierarchy (e.g., the organization hierarchy 101, FIG. 1) may be defined first (see, e.g., block 301, FIG. 3), followed by all of the territories (see, e.g., block 307, FIG. 3), and so on, so that a single iteration of the definition process illustrated in FIG. 3 will result in a completely defined organization hierarchy. When the entire time-based organization hierarchy has been defined, as determined at process block 319 (see, e.g., FIG. 3), then the completed time-based organization hierarchy may be created and implemented, via a computer system for example, to assign sales credit and calculate compensation (see, e.g., process block 321) in response to a sales data input associated with a transaction.

With reference now primarily to FIG. 9, an embodiment of a flow of events in an example sales-based compensation process is shown in accordance with an embodiment of the present invention. In the embodiment illustrated in FIG. 9, a transaction (e.g., an order corresponding to a sale of a product or service) may be received by a computer system (via user input for example) such as the client 203 (see, e.g., FIG. 2) (see, e.g., process block 901). A sales data input, including information corresponding to the transaction such as the order date, amount, quantity, location, and the like, may then be imported to a server, for example (e.g., the application server 205, FIG. 2) (see, e.g., process block 903). The server may then process the sales data input in conjunction with one or more instances of an organization hierarchy (e.g., the organization hierarchy 101, FIG. 1) to assign and/or audit sales credit (see, e.g., process block 905) to correspond to one or more defined positions in response to one or more assignment rules. A sales credit assignment process is described in greater detail in co-pending U.S. patent application Ser. No. 10/273,679, filed Oct. 18, 2002, and titled METHOD AND SYSTEM FOR SALES-CREDIT ASSIGNMENT VIA TIME-BASED ORGANIZATION HIERARCHIES, incorporated herein by reference.

At this point, the user may monitor his or her (or another's) achievement and attainment (see, e.g., how much of a node owner's quota has been fulfilled for a specified attainment period) (see, e.g., process block 907) corresponding to a position in the organization hierarchy, and compensation may be calculated based on the current sales credit assigned to any given position (see, e.g., process block 909). An achievement and attainment monitoring process, and a compensation calculation process are described in greater detail in co-pending U.S. patent application Ser. No. 10/273,632, filed Oct. 18, 2002, and titled METHOD AND SYSTEM FOR MONITORING ACHIEVEMENT AND ATTAINMENT AND CALCULATING COMPENSATION VIA TIME-BASED ORGANIZATION HIERARCHIES, incorporated herein by reference.

In some cases, elements of the transaction (e.g., the amount of the transaction) may change from the time the transaction is first received, and the time it is invoiced and/or fully executed. In these cases, sales credit may be assigned based on the sales data input corresponding to the transaction, but may need to be adjusted to properly account for the net change in the transaction (e.g., the amount of the order may have increased, and the salespersons should be compensated accordingly). In order to effectively account for these changes, the system of an embodiment of the present invention may monitor the transaction for a net change (see, e.g., process block 911), and if a change is detected (see, e.g., process block 913), the sales credit may be re-assigned (see, e.g., block 905), and the process may enter an iterative loop so long as such changes continue to be detected.

By using the effective period defined for each instance of the organization hierarchy, retroactive transactions can accurately and automatically be processed using the instance of the organization hierarchy that was effective at the right point in time, thereby reducing or eliminating manual adjustments that are both error prone and time consuming. When no net change is detected (see, e.g., block 913), then the process begins anew with the receipt of a subsequent transaction (see, e.g., block 901) via another sales data input.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes that come within the meaning and range of equivalency of the claims are intended to be embraced therein.

What is claimed is:

1. A method, comprising:
    generating a user interface including a plurality of user interface displays to manage a time-based organization hierarchy;
    receiving a first user input, the first user input comprising a first effective period, the first effective period defined by a start date and an end date;
    associating, by a processor, the first effective period with a node, in response to the receiving the first user input;
    establishing the node as a root node of a first instance of the time-based organization hierarchy;
    establishing a second additional node and a third additional node as nodes of the first instance of the time-based organization hierarchy;
    establishing the first effective period as the period for which the first instance of the time-based organization hierarchy as a whole is effective;
    receiving a second user input, the second user input comprising a definition of at least one territory;
    prompting a user for a third user input comprising an effective period for the at least one territory;
    ensuring by the processor, that the effective period falls within the first effective period; and
    associating, by the processor, the territory with the node, in response to receipt of the second and third user inputs.

2. The method of claim 1, wherein the definition of the at least one territory includes a position corresponding to a quota and a credit allocation.

3. The method of claim 2, further comprising assigning sales credit and calculating compensation corresponding to the position in response to a sales data input.

4. The method of claim 1, wherein the definition of the first instance of the time-based organization hierarchy further includes a corresponding sales model.

5. The method of claim 4, wherein the corresponding sales model comprises a user-specified term selected from a group including direct sales, service, product specialist, channel, inside sale, and global account.

6. The method of claim 1, wherein the definition of the at least one territory further includes an assignment rule.

7. The method of claim 6, wherein the assignment rule includes a criteria against which a comparison may be made to assign sales credit.

8. The method of claim 7, wherein the criteria corresponds to a geographical area.

9. The method of claim 1, wherein the at least one territory corresponds to a geographical area.

10. The method of claim 1, further comprising, storing the first instance of the time-based organization hierarchy in a memory.

11. The method of claim 1, further comprising
    receiving a fourth user input, the fourth user input comprising revisions to the first instance of the time-based organization hierarchy and a second effective period that does not overlap the first effective period; and
    creating a definition of a second instance of the time-based organization hierarchy from the revisions, the definition of the second instance of the time-based organization hierarchy including the second effective period, wherein the second instance of the time-based organization hierarchy is a modified version of the first instance of the time-based organization hierarchy.

12. The method of claim 11, further comprising, storing the second instance of the time-based organization hierarchy in a memory, wherein storing the second instance of the time-based organization hierarchy comprises storing revisions, the revisions distinguishing the second instance from the first instance of the time-based organization hierarchy.

13. The method of claim 11, further comprising calculating compensation corresponding to the position via the first instance of the time-based organization hierarchy or the second instance of the time-based organization hierarchy in response to a sales data input.

14. The method of claim 13, wherein calculating compensation corresponding to the position includes a retro-calculation in response to an adjustment of the sales data input.

15. A non-transitory machine-readable medium having instructions stored thereon, which when executed causes a machine to perform operations comprising:
  generating a user interface including a plurality of user interface displays to manage a time-based organization hierarchy;
  receiving a first user input comprising a first effective period, wherein the first effective period is defined by a start date and an end date;
  associating the first effective period with a node, in response to the receiving the first user input;
  establishing the node as a root node of a first instance of the time-based organization hierarchy;
  establishing a second additional node and a third additional node as nodes of the first instance of the time-based organization hierarchy;
  establishing the first effective period as the period for which the first instance of the time-based organization hierarchy as a whole is effective;
  receiving a second user input, the second user input comprising a definition of at least one territory;
  prompting a user for a third user input comprising an effective period for the at least one territory; ensuring that the effective period falls within the first effective period; and
  associating the territory with the node, in response to receipt of the second and third user inputs.

16. The machine-readable medium of claim 15, wherein the definition of the at least one territory includes a position corresponding to a quota and a credit allocation.

17. The machine-readable medium of claim 16, further comprising assigning sales credit and calculating compensation corresponding to the position in response to a sales data input.

18. The machine-readable medium of claim 15, wherein the definition of the first instance of the time-based organization hierarchy further includes a corresponding sales model.

19. The machine-readable medium of claim 15, wherein the definition of the at least one territory further includes an assignment rule.

20. The machine-readable medium of claim 19, wherein the assignment rule includes a criteria against which a comparison may be made to assign sales credit.

21. The machine-readable medium of claim 20, wherein the criteria corresponds to a geographical area.

22. The machine-readable medium of claim 15, wherein the at least one territory corresponds to a geographical area.

23. The machine-readable medium of claim 15, further comprising
  receiving a fourth user input, the fourth user input comprising revisions to the first instance of the time-based organization hierarchy and a second effective period that does not overlap the first effective period; and
  creating a definition of a second instance of the time-based organization hierarchy from the revisions, the definition of the second instance of the time-based organization hierarchy including the second effective period, wherein the second instance of the time-based organization hierarchy is a modified version of the first instance of the time-based organization hierarchy.

24. The machine-readable medium of claim 23, further comprising calculating compensation corresponding to the position via the first instance of the time-based organization hierarchy or the second instance of the time-based organization hierarchy in response to a sales data input.

25. The machine-readable medium of claim 24, wherein calculating compensation corresponding to the position includes a retro-calculation in response to an adjustment of the sales data input.

26. The machine-readable medium of claim 15, wherein the corresponding sales model comprises a user-specified term selected from a group including direct sales, service, product specialist, channel, inside sale, and global account.

27. A method, comprising:
  defining an instance of an organization hierarchy to include at least three nodes;
  associating, by a processor, a first node of the at least three nodes of the instance of the organization hierarchy with an effective period defined by a start date and an end date, in response to the defining the instance;
  establishing the effective period as the period for which the instance of the organization hierarchy as a whole is effective;
  establishing the first node as a root node of the instance of the organization hierarchy;
  defining a plurality of territories, each territory including a position corresponding to a quota and a credit allocation;
  associating, by the processor, each of the plurality of territories to a respective one of each of the at least three nodes;
  associating, by the processor, a first territory corresponding to the first node with a first effective period for the first territory, in response to the defining the plurality of territories;
  ensuring, by the processor, that the first effective period falls within the effective period; and
  assigning sales credit and calculating compensation for the position of a one of the plurality of territories in response to a sales data input.

28. The method of claim 27, wherein the instance of the organization hierarchy corresponds to a sales model.

29. The method of claim 28, wherein the sales model comprises a user-specified term selected from a group including direct sales, service, product specialist, channel, inside sale, and global account.

30. The method of claim 27, wherein each territory further includes an assignment rule.

31. The method of claim 27, wherein each territory corresponds to a geographical area.

32. The method of claim 27, wherein each territory corresponds to an industry sector.

33. The method of claim 27, wherein defining each territory includes defining the position, defining the quota, and defining the credit allocation.

34. The method of claim 27, wherein assigning sales credit and calculating compensation includes a retro-calculation of compensation in response to an adjustment of the sales data input.

35. The method of claim 27, wherein associating each of the plurality of territories to a respective one of each of the at least three nodes comprises selecting a respective previously defined territory to correspond to each of the at least three nodes, the respective previously defined territory further corresponding to a node in a second instance of the organization hierarchy.

36. A non-transitory machine-readable medium having instructions stored thereon, which when executed causes a machine to perform operations comprising:
  generating a first user interface by which a user may define a first effective period defined by a start date and an end date;

associating the first effective period with a first node of a plurality of nodes, in response to the receiving the first user input, wherein the plurality of nodes comprises at least three nodes;

establishing the first node as a root node of a first instance of an organization hierarchy;

establishing the plurality of at least three nodes as nodes of the first instance of the organization hierarchy;

establishing the first effective period as the period for which the first instance of the organization hierarchy as a whole is effective;

generating a second user interface by which a user may define a plurality of territories, each territory including a position corresponding to a quota and a credit allocation;

generating a third user interface by which a user may define an effective period for a first territory of the plurality of territories;

ensuring that the effective period falls within the first effective period;

associating each of the plurality of territories to a respective one of the plurality of nodes, in response to receiving a user definition of the plurality of territories via the second user interface; and assigning sales credit and calculating compensation for the position of a one of the plurality of territories in response to a sales data input.

37. The machine-readable medium of claim 36, wherein the first instance of the organization hierarchy corresponds to a sales model.

38. The machine-readable medium of claim 36, wherein each territory further includes an assignment rule.

39. The machine-readable medium of claim 36, wherein the sales model comprises a user-specified term selected from a group including direct sales, service, product specialist, channel, inside sale, and global account.

40. The machine-readable medium of claim 36, wherein each territory corresponds to a geographical area.

41. The machine-readable medium of claim 36, wherein each territory corresponds to an industry sector.

42. The machine-readable medium of claim 36, wherein defining each territory includes defining the position, defining the quota, and defining the credit allocation.

43. The machine-readable medium of claim 36, wherein assigning sales credit and calculating compensation includes a retro-calculation of compensation in response to an adjustment of the sales data input.

44. The machine-readable medium of claim 36, wherein associating each of the plurality of territories to a respective one of each of the plurality of nodes comprises selecting a respective previously defined territory to correspond to each of the plurality of nodes, the respective previously defined territory further corresponding to a node in a second instance of the organization hierarchy.

* * * * *

UNITED STATES PATENT AND TRADEMARK OFFICE
CERTIFICATE OF CORRECTION

| | | |
|---|---|---|
| PATENT NO. | : 7,937,284 B2 | Page 1 of 1 |
| APPLICATION NO. | : 10/273538 | |
| DATED | : May 3, 2011 | |
| INVENTOR(S) | : Chang et al. | |

It is certified that error appears in the above-identified patent and that said Letters Patent is hereby corrected as shown below:

In column 5, line 32, delete "UTI" and insert -- UI --, therefor.

Signed and Sealed this
Eighteenth Day of October, 2011

David J. Kappos
*Director of the United States Patent and Trademark Office*